Sept. 30, 1952  R. E. J. NORDQUIST  2,612,089
MACHINE FOR COUNTING AND STACKING ARTICLES
Filed Nov. 12, 1948  4 Sheets-Sheet 2
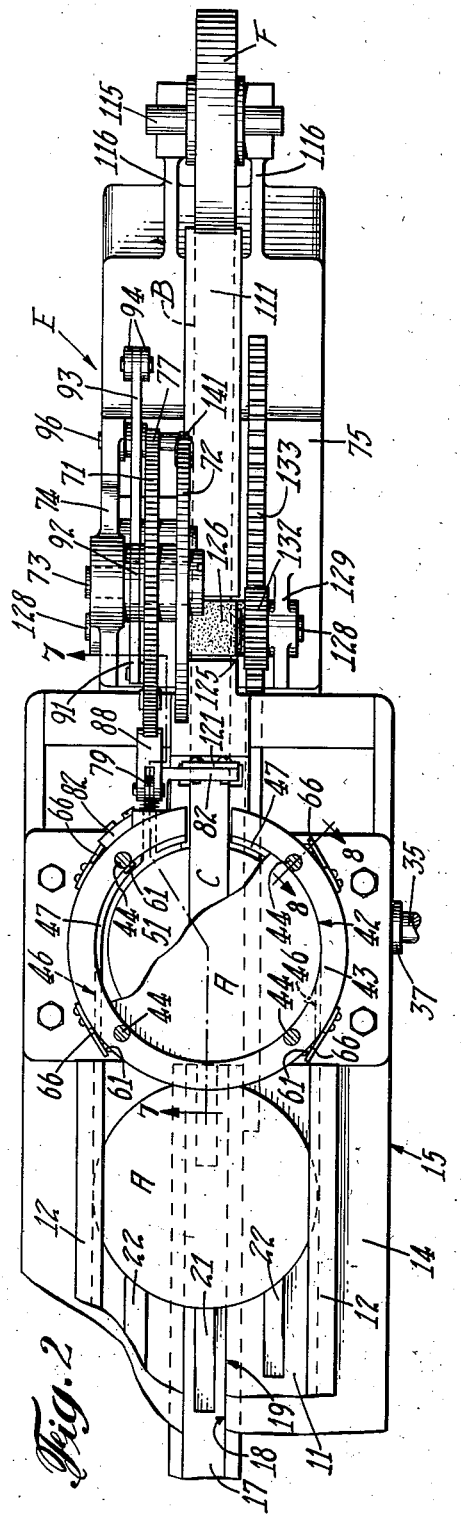
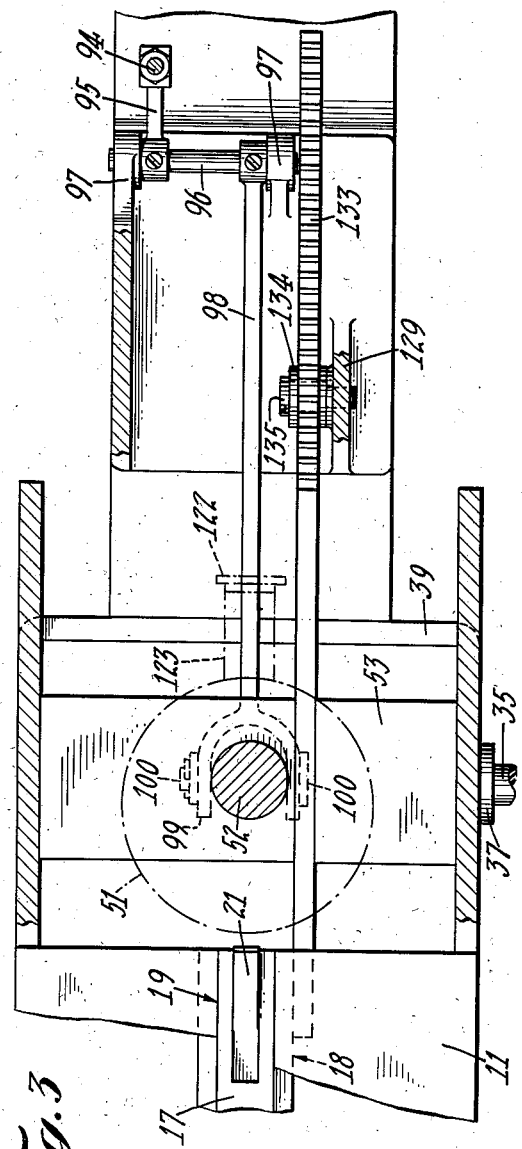
INVENTOR.
Ronald E. J. Nordquist
BY Ivan D. Thornburgh
Charles H. Cane
ATTORNEYS

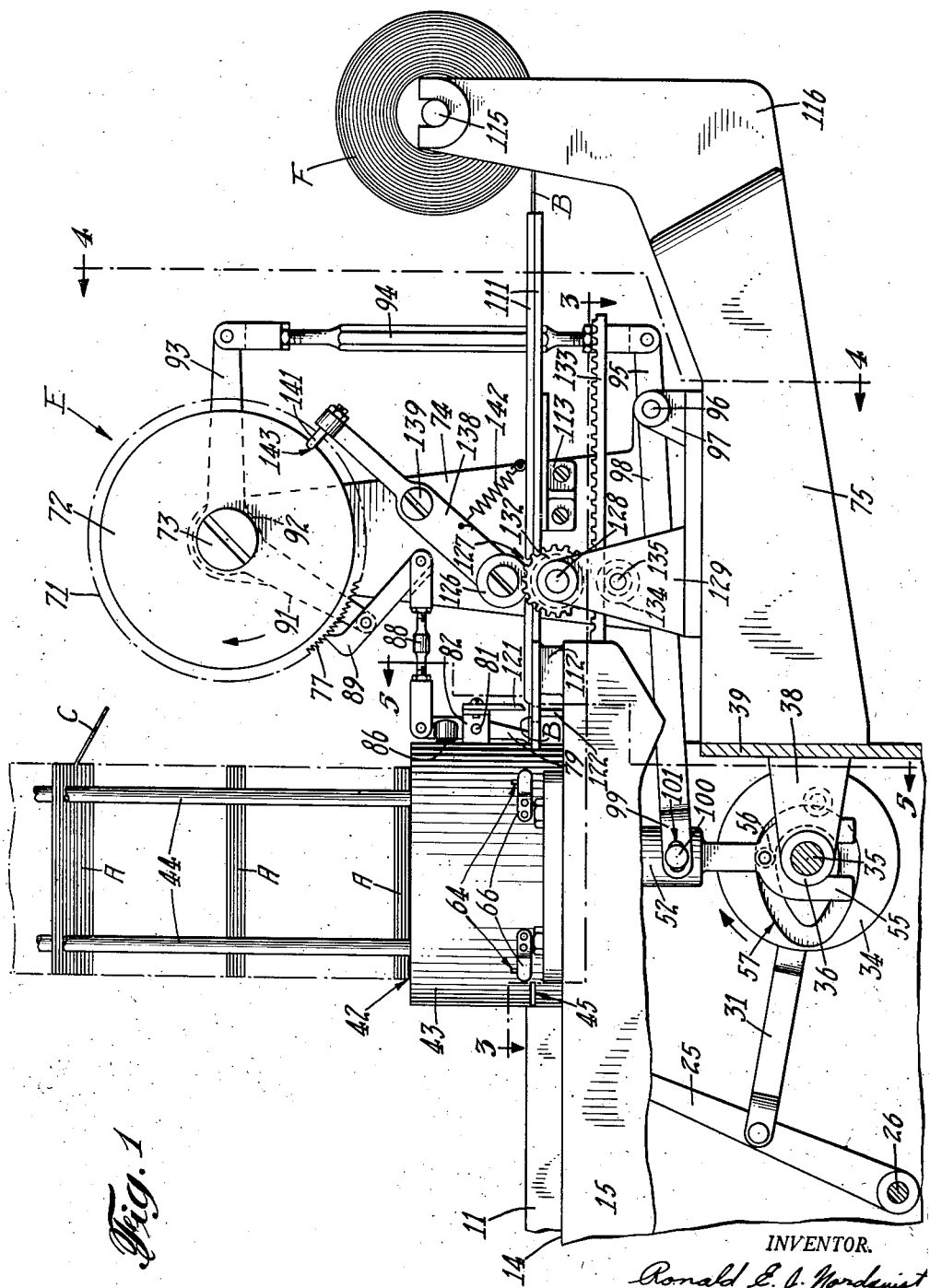

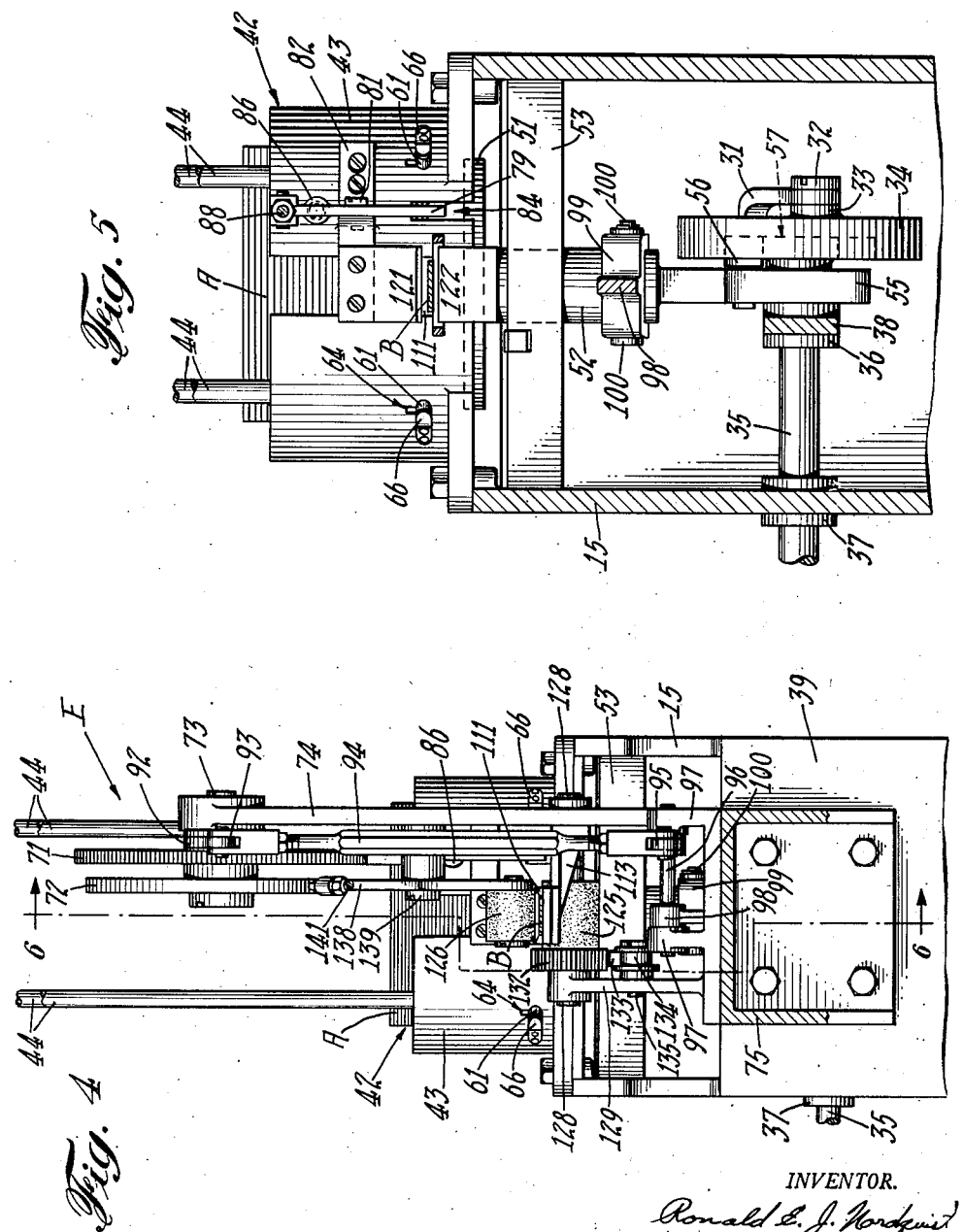

Sept. 30, 1952   R. E. J. NORDQUIST   2,612,089
MACHINE FOR COUNTING AND STACKING ARTICLES
Filed Nov. 12, 1948   4 Sheets-Sheet 4
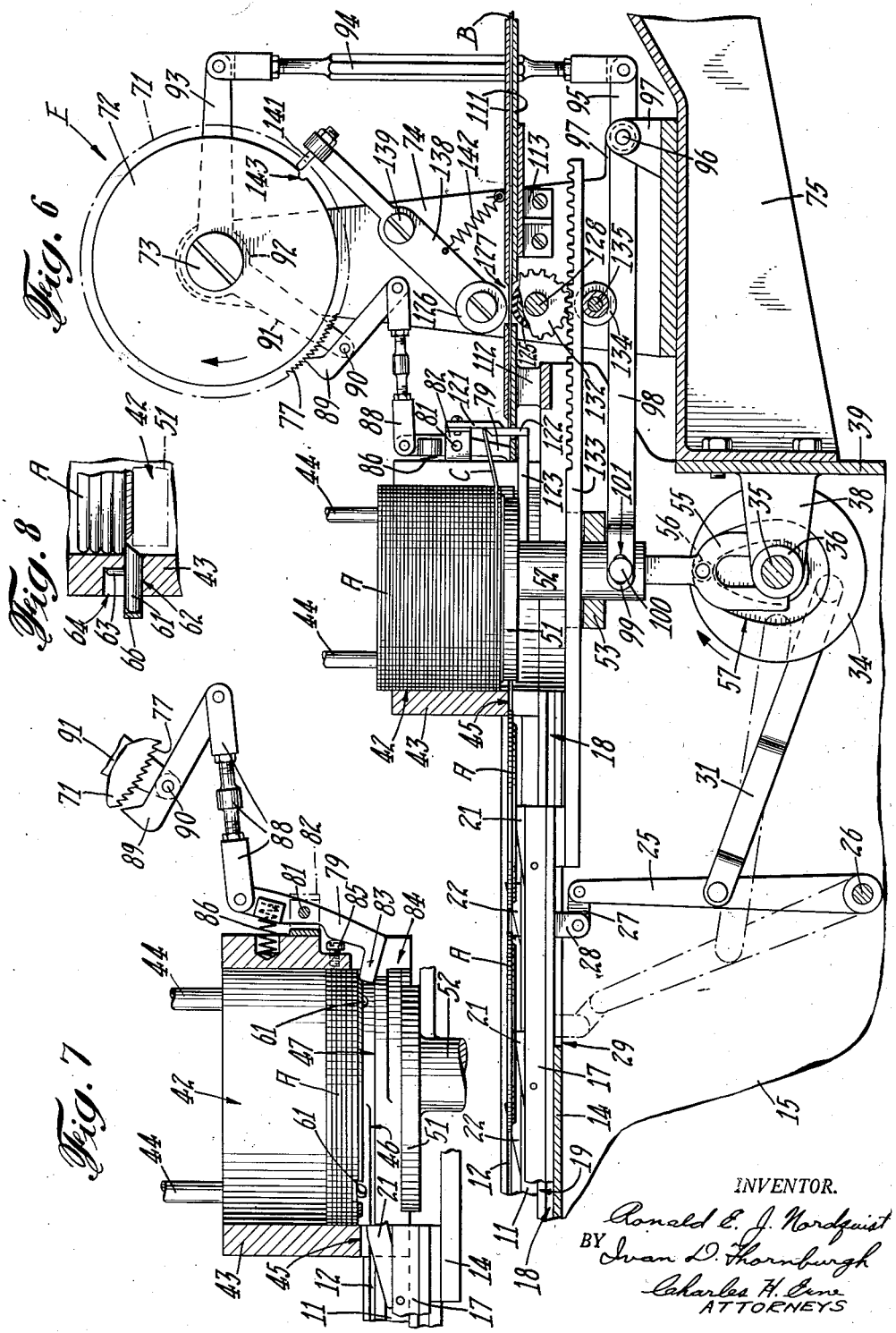
INVENTOR.
Ronald E. J. Nordquist
BY Ivan D. Thornburgh
Charles H. Ine
ATTORNEYS Patented Sept. 30, 1952

2,612,089

UNITED STATES PATENT OFFICE 2,612,089

MACHINE FOR COUNTING AND STACKING ARTICLES

Ronald E. J. Nordquist, Maplewood, N. J., assignor to American Can Company, New York, N. Y., a corporation of New Jersey Application November 12, 1948, Serial No. 59,595

7 Claims. (Cl. 93—93)

1

The present invention relates to a machine for stacking and counting articles and has particular reference to devices for counting off a predetermined number of the articles as they are stacked and for inserting markers between the articles at the end of each count to visibly indicate and separate or divide counted groups or batches of articles.

An object of the invention is the provision of a machine for stacking and counting articles wherein the articles as they are stacked are accurately counted off into batches of a predetermined number of articles and the batches divided by markers inserted into the stack during the stacking operation so as to facilitate removal of the batches separately for subsequent treatment or shipment or storage.

Another object is the provision of such a stacking and counting machine wherein the counting of the articles is effected by the articles themselves as they are added to the stack so that any articles missed by irregular feeding of the articles are omitted from the count with the result that a highly accurate and dependable count is obtained.

Another object is the provision of such a stacking and counting machine which is simple in construction and which embodies various novel features particularly adapted to high speed operation with a minimum maintenance factor.

Numerous other objects and advantages of the invention will be apparent as it is better understood from the following description, which, taken in connection with the accompanying drawings, discloses a preferred embodiment thereof.

Referring to the drawings:

Figure 1 is a side view of a stacking machine embodying the instant invention, with parts broken away and parts shown in section;

Fig. 2 is a top plan view of the machine shown in Fig. 1, with parts broken away;

Fig. 3 is an enlarged horizontal section taken substantially along the broken line 3—3 in Fig. 1, with parts broken away;

Figs. 4 and 5 are transverse sectional views taken substantially along the respective broken lines 4—4, 5—5 in Fig. 1, with parts broken away, Fig. 5 being drawn on an enlarged scale;

Fig. 6 is a longitudinal section taken substantially along the broken line 6—6 in Fig. 4, with parts broken away; and Figs. 7 and 8 are enlarged sectional detail views taken substantially along the lines 7—7, 8—8, in Fig. 2.

As a preferred and exemplary embodiment of

2 the invention the drawings illustrate a machine for stacking sheet metal end members or covers A for cans or containers although the invention is equally well adapted to other articles. As each cover A (Fig. 6) is added to the stack it is counted. When a predetermined number of covers have been counted out to form a desired batch, a strip B of paper or other marker or divider material is fed into place in the stack and cut off so that a portion of the strip extends beyond the stack, thus producing a marker C that visibly indicates the termination of the batch.

The covers A are fed individually into the machine in a horizontal position from any suitable source of supply, such as a forming press or a flange curling device or other machine. As they are received, the covers are advanced in spaced and timed order along a horizontal runway 11 (Figs. 1, 2, 6 and 7) having grooved side guides 12 which support and guide the covers. The runway 11 is secured to a horizontal table 14 of a frame 15 which constitutes the main frame of the machine.

Advancement of the covers A along the runway is effected preferably by a conventional reciprocating stroke or feed bar 17 which operates in a T slot 18 formed in the table 14. The bar projects up through a longitudinal slot 19 in the runway 11 and carries a plurality of spaced depressible feed dogs 21 which engage behind the covers for advancing them. Depressible stationary holding dogs 22 are provided in the runway 11 for holding an advanced cover in position during the return stroke of the feed bar 17.

The feed bar 17 is reciprocated through a feeding stroke (toward the right as viewed in Fig. 6) and thence through a return stroke by an upright arm 25 (Figs. 1 and 6). The lower end of the arm 25 is mounted on a pivot shaft 26 carried in suitable bearings formed in the frame 15. The upper end of the arm 25 is pivotally connected by a short link 27 to a lug 28 which depends from the stroke bar 17. The lug 28 extends down through a slot 29 formed in the table 14.

The arm 25 is rocked on its pivot shaft 26 by a connecting rod 31. One end of the rod is connected pivotally to the arm 25 intermediate its ends. The opposite end of the rod is mounted on an eccentric stud 32 (see Fig. 5) secured in an eccentrically disposed boss 33 formed on the outer face of an eccentric disc 34. The eccentric disc 34 is keyed to a continuously rotating drive shaft 35 journaled in a pair of spaced bearings 36, 37. Bearing 36 is formed in a bracket 38 secured to a transverse web section 39 (see Fig. 1) of the frame 15 while the bearing 37 is formed in an upright side portion of the frame. The drive shaft 35 may be rotated in any suitable manner.

Hence as the drive shaft 35 rotates, it revolves the eccentric disc 34 and thus through the connecting rod 31 and arm 25 it reciprocates the feed bar 17 through the feeding and return strokes hereinbefore mentioned. During successive feeding strokes of the feed bar 17 a cover A is intermittently advanced along the runway 11 and is then introduced into a magazine 42 which is disposed at the terminal end of the runway.

The magazine 42 includes a vertical tubular shell 43 which is secured to the top of the table 14 of the frame 15. This shell is open at both ends and extends upwardly from the table so that the covers may be stacked into it from the lower end, although the invention is equally well adapted to a mechanism in which the covers are fed onto the top of a stack instead of onto the bottom of the stack as shown in the drawings.

The upper end of the magazine shell 43 carries a plurality of upright guide rods 44 which retain the covers in stacked relation as the stack builds up beyond the shell. These rods facilitate manual removal of the covers in batches as will be hereinafter mentioned. The lower end of the shell 43 is formed with an inlet opening 45 and cover guide grooves 46 and cover support ledges 47 (Figs. 2, 6 and 7) forming continuations of the guide rails 12 to admit and guide the covers into stacking position within the shell. The feed bar 17 feeds the covers into this position. When wholly within the magazine the advanced cover is supported on the support ledges 47.

As each cover A is fed into stacking position within the magazine shell 43 it is counted and is then lifted vertically within the shell to take its place in the stack of covers retained in the magazine. The lifting of a cover will be explained first. This lifting operation is effected by a vertically movable lifter pad 51 (Figs. 2, 6 and 7) which is located in the lower end of the magazine just below the cover support ledges 47. The lifter pad 51 is carried on the upper end of a vertically movable stem 52. The stem extends down through a horizontal guide plate 53 (see also Figs. 3 and 5) disposed transversely of the machine and secured at its ends to the side members of the frame 15. At its lower end, the stem 52 is formed with a yoke 55 which straddles the main drive shaft 35 between the shaft bearing 36 and the eccentric disc 34. This yoke and the guide plate maintain the stem in a vertical position.

The stem 52 and the lifter pad 51 carried thereon are raised and lowered by cam action in time with the feeding of the covers A. For this purpose the yoke 55 carries a cam roller 56 (Figs. 1, 5 and 6) which operates in a cam groove 57 formed in the inner face of the eccentric disc 34.

Hence as the main drive shaft 35 rotates the eccentric disc 34 to reciprocate the stroke bar 17, it simultaneously actuates the lifter pad 51 through an upward or cover stacking stroke and thence downward through a return stroke. This raising and lowering of the lifter pad takes place while the stroke bar 17 is moving back through a return stroke after feeding a cover A into the magazine shell 43. Thus, just as soon as a cover A has been fully positioned within the magazine shell 43, the lifter pad 51 begins its upward stroke.

As the lifter pad 51 moves up through a cover stacking stroke it engages and lifts the cover from the support ledge 47 in the magazine shell 43 and raises the cover up into the shell above the feed level or line of the stroke bar 17. During this upward travel, the lifter pad 51 forces the cover A past and beyond a plurality of stack support plungers or fingers 61 (Figs. 2, 7 and 8) which are yieldably mounted in the magazine shell and which project into the magazine for supporting the stack of covers as it builds up in the magazine.

There are four stack support fingers 61 arranged around the inner periphery of the magazine 42. These fingers are cylindrical in form and are located in bores 62 which extend through the side wall of the magazine shell 43. Upright pins 63 secured in the fingers operate in narrow recesses 64 formed in the shell adjacent the bores 62 and thus prevent the fingers from turning. These pins also limit the inward travel of the fingers. The inner ends of the fingers are formed with tapered noses 65 to facilitate movement of a cover A past the fingers. The outer ends of the fingers are engaged by flat springs 66 which are secured to the outer surface of the magazine shell 43. These springs maintain the fingers in a normal stack supporting position as best shown in Fig. 8 but yield sufficiently to allow the fingers to move outwardly as a rising cover A engages and snaps past them.

As a lifted cover A moves above the fingers 61, the fingers snap back into place under the cover. The lifter pad 51 then returns to its original lowered position, leaving the elevated cover A supported on the stack support fingers 61. This operation is repeated for each cover A upon reception of the cover in the magazine. Hence as each cover is lifted into a position above the stack support fingers 61 it is added to the bottom of a stack which is built up as a result of the repeated movements of the lifter pad.

Accurate counting of the covers A as they are added to the bottom of the stack is effected by a counting device E (Figs. 1, 2, 4 and 6) which controls the insertion of a marker C into the stack after a predetermined number of covers have been counted as hereinbefore mentioned. This counting device includes a counting wheel 71 and a count divider or count terminating or strip control wheel 72 which are formed integrally and which rotate as a unitary structure on a stud 73. The stud is secured in an upright bracket 74 which is disposed adjacent the cover magazine shell 43 and which is bolted to an extension 75 of the machine frame 15.

The counting wheel 71 is rotated intermittently in a step-by-step manner, one step for each cover A added to the stack by the lifter pad 51. For this purpose, the outer edge or periphery of the counting wheel 71 is formed with a plurality of ratchet or counting teeth 77 which in number are equal to a multiple of the number of covers desired in each batch separated by the markers C. In the instant case, as shown in the drawings by way of example, two hundred covers are included in each batch. Hence the counting wheel is provided with two hundred teeth, which is sufficient to occupy the entire periphery of the wheel. Thus the wheel rotates once for each batch of covers.

Rotation of the counting wheel 71 is effected by each cover A as it enters the magazine 42 and is lifted into place in the stack. This is brought about by an upright detector or counting finger 79 (see Figs. 5 and 7) which is mounted on a pivot pin 81 carried in a bracket 82 bolted to the outside of the magazine shell 43. The lower end of the detector finger is formed with a lug 83 which extends through a slot 84 in the magazine shell and which normally projects into the magazine 42 in the path of travel of a cover A entering the magazine.

An adjusting screw 85 in the magazine shell engages the detector finger 79 and limits the inward travel of the lug 83. This screw may be adjusted to effect the desired contact of lug 83 by a cover A. The finger is maintained in this normal position by a compression spring 86 which is interposed between the magazine shell 43 and the detector finger adjacent the upper end of the finger.

At its upper end, the detector finger 79 is pivotally connected to a link 88. The opposite end of the link is pivotally connected to a pawl 89 which is disposed adjacent the periphery of the counting wheel 71 and which is normally disengaged from the ratchet teeth 77 thereon. Intermediate its ends, the pawl 89 is mounted on a pivot pin 90 carried in an arm 91 of a bell crank 92 freely mounted on the counting wheel stud 73.

A cooperating arm 93 of the bell crank 92 is connected to the upper end of a vertically disposed actuating link 94. The lower end of this link is connected to a horizontal arm 95 (see also Fig. 3) secured to a rocker shaft 96 carried in bearing lugs 97 formed on the bracket 74. The rocker shaft 96 also carries an actuating arm 98 which extends toward the stem 52 of the lifter pad 51. Adjacent the lifter pad, the arm is formed with a yoke 99 which partially surrounds the stem 52 and which is pivotally connected thereto by a pivot pin 100 which extends through the stem 52 and through elongated slots 101 formed in the yoke.

Hence when a cover A enters the magazine 42 for lifting into position in the stack, it engages the lug 83 of the detector finger 79 and pushes the lug outwardly until the cover is fully seated on its support ledges 47 in the magazine. This movement of the lug 83 rocks the detector finger 79 on its pivot pin 81 and through the link 88 rocks the pawl 89 into engagement with the ratchet teeth 77 of the counting wheel 71.

Thus when the lifter pad 51 moves up through its stacking stroke and lifts the cover A into position in the stack, it rocks the actuating arm 98 and arm 95 and through the vertical actuating link 94, it rocks the bell crank 92 in a clockwise direction as viewed in Figs. 1 and 6. This movement of the bell crank moves the pawl 89 forward and since the pawl is engaged with the ratchet teeth 77 of the counting wheel 71, the wheel rotates with the pawl. In this manner the counting wheel and the count divider wheel 72 connected therewith are partially rotated a distance equal to one ratchet tooth 77 for every cover A added to the stack.

During this stacking operation, the cover A being stacked, rides along the inner edge of the lug 83 on the detector finger 79 and thus holds the pawl 89 engaged with the ratchet teeth 77. However, as soon as the cover reaches its position in the stack, it rides off the lug 83 and thus releases the detector finger 79. The compression spring 86 thereupon rocks the detector finger and thus withdraws the pawl 89 from the ratchet teeth 77. Thus when the lifter pad 51 moves down through its return stroke, the pawl is out of engagement with the ratchet teeth, and hence the counting wheel 71 and the count divider wheel 72 remain stationary in their partially rotated position.

When for any reason no cover is fed into the magazine 42 upon a forward stroke of the feed bar 17, the detector finger 79 remains in its normal position since there is no cover to operate it. Hence the pawl 89 remains in its normal position out of engagement with the ratchet teeth 77, and during the following lifting stroke of the lifter pad 51, the pawl moves forward with the bell crank 92 but does not rotate the counting wheel 71 and the count divider wheel 72 as explained above. These wheels remain stationary during such an idle stroke of the machine and thus the missing cover is not counted. In this manner an accurate count is effected.

When the counting wheel 71 and its count divider wheel 72, after repeated partial rotations, have rotated far enough to indicate the termination of a batch of covers, as for example in the instant case where the batch is terminated with the depositing of the 200th cover in the stack, a strip B of paper or other material is fed forward into the magazine through a slot therein and placed in a position between the lowermost or 200th cover in the stack, and the incoming or 201st cover, and is cut off to provide the marker C hereinbefore mentioned.

The strip B is enclosed preferably in a pair of cooperating horizontally disposed guides 111 (Figs. 1, 2, 4 and 6) which are carried on brackets 112, 113. The bracket 112 is formed on the machine frame 15 while the bracket 113 is secured to the upright bracket 74. The strip may be received from any suitable source of supply such as a reel F of strip material supported on an axle 115 carried in a bracket 116 formed as a part of the frame extension 75.

The strip B normally remains stationary with its inner end disposed adjacent a pair of cut off blades 121, 122 extending transversely of the path of travel of the strip. The blade 121 is a stationary blade located above the path of travel of the strip and is secured to the detector finger bracket 82. The blade 122 is a movable blade disposed below the path of travel of the strip and is secured to a support 123 which extends out from the lifter pad 51 (see Fig. 6). The lower blade 122 moves up with the lifter pad 51 each time the pad raises but no cutting action takes place until the strip B is fed into position between the blades. This only takes place at the end of a batch of covers as explained hereinbefore.

The strip B is fed into cutting position by a pair of cooperating feed rollers 125, 126 (Figs. 4 and 6). These rollers are disposed adjacent the path of travel of the strip and operate in an opening 127 formed in the strip guides 111. The roller 125 is disposed below the path of travel of the strip and is mounted on a short shaft 128, the ends of which are carried in bearings formed in the upright bracket 74 and in a cooperating bracket 129 formed on the bracket 74. The roller is intermittently rotated in opposite directions by a gear 132 which is keyed to the roller shaft 128. This gear meshes with a rack 133 which is secured to and is reciprocated by the feed bar 17. Opposite the gear 132, the rack is supported on a grooved idler pulley 134 carried on a stud 135 secured in the bracket 129.

Through its connection with the stroke bar 17, the rack 133 rotates the lower feed roller 125 in a counterclockwise or strip feeding direction (as viewed in Fig. 6) during the feeding stroke of the bar. The stroke bar normally rotates this roller during each stroke, first in the strip feeding direction (counterclockwise in Fig. 6) and then in a return direction (clockwise in Fig. 6) without feeding the strip B, the roller merely touching the strip lightly with insufficient frictional grip to move it.

Feeding of the strip B is effected at the proper time by the roller 126 which is a pressure roller and which is located in the opening 127 of the guides 111 and above the path of travel of the strip. This pressure roller is rotatably mounted on one end of a lever 138, which intermediate its ends is carried on a pivot pin 139 secured in the upright bracket 74. The opposite end of the lever carries an indent pin 141 which normally rides on the outer periphery of the count divider wheel 72 as best shown in Fig. 6. A tension spring 142 having one end hooked into the lever 138 adjacent the pressure roller 126 and having its opposite end secured to the top of the strip guides 111, maintains the indent pin 141 in contact with the wheel.

While the indent pin 141 rides on the periphery of the count divider wheel 72, it holds the pressure roller 126 in an elevated position slightly spaced above and out of contact with the strip B. However when the termination of a batch of covers is reached during the stacking operation, as for example when the 200th cover has been added to the stack, the pressure roller 126 moves down against the strip B and presses the strip against the feed roller 125. This takes place at a predetermined time in the cycle of the stroke bar 17, preferably at the end of the outward or return stroke of the bar. At this instant the bar and the feed roller 125 are momentarily stationary and ready to begin a forward or feeding stroke.

The downward movement of the pressure roller 126 is effected by a notch or recess or indent 143 (Figs. 1 and 6) which is formed in the periphery of the count divider wheel 72. There may be more than one of these indents 143 in the count divider wheel, depending upon the number of covers A to be set off in the stack as a batch and in accordance with the number of ratchet teeth 77 disposed between the indents. Where the entire periphery of the counting wheel 71 is required to count out one batch of covers A, as in the example of 200 covers herein mentioned, only one indent 143 is required as shown in the drawings.

When sufficient covers A have been added to the stack in the magazine 42 to complete a batch of 200 covers, the counting wheel 71 has been rotated through a complete revolution, and the last step of its rotation for the 200th cover rotates the indent 143 into register with the indent pin 141. This permits the indent pin 141 to fall into the indent 143 as shown in Fig. 1. It is this action that lowers the pressure roller 126 into contact with the strip B under pressure of the spring 142.

Hence when the stroke bar 17 moves forward and advances the 201st cover A into the magazine 42, its rack 133 rotates the feed roller 125 in a counterclockwise direction and thus under pressure of the pressure roller 126, feeds the strip B between the open cut off blades 121, 122 and into position between the 200th and the 201st covers A in the magazine. As soon as the stroke bar 17 completes its feeding stroke, the lifter pad 51 begins its lifting stroke and raises the 201st cover into position at the bottom of the stack separated by the strip B.

During this lifting operation, the lower cut off blade 122 moves up and in cooperation with the upper blade 121 severs the strip B and leaves the cut off portion in place between the 200th and the 201st covers, thus producing the marker C which visibly indicates the termination of a batch of 200 covers and the beginning of a new batch. Simultaneously with this action, the rotation of the counting wheel 71 and its count divider wheel 72 for the 201st cover, advances the indent 143 one step and thus forces the indent pin 141 out of the indent. This rocks the lever 138 and thus returns or lifts the pressure roller 126 into its normal position out of contact with the strip B and thus prevents feeding of the strip away from the cut off blades 121, 122 and further permits the strip to remain stationary during the following strokes of the feed bar 17 and the lifter pad 51 until the termination of the next batch of covers. This completes the cycle of operation of the machine for the stacking of one batch of covers.

In practice the machine operates continuously and builds up a stack of covers containing a plurality of batches separated only by the markers or separators C. As required, the individual batches of covers are removed manually from the top of the stack for use or storage, the markers C plainly indicating where one batch begins and the next batch ends, with the assurance that each batch contains an accurately counted predetermined number of covers.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a counting and stacking machine, the combination of means for feeding articles to a stack of such articles, a counter arranged to count a predetermined number of articles as they are added to the stack to form a batch, counter actuating means operable adjacent said counter in time with said feeding means, detector means located in the path of articles entering the stack and engageable by each article as it is added to said stack for connecting said counter actuating means with said counter to actuate the counter, a pair of rollers disposed in spaced relation on opposite sides of a normally stationary strip of marker material, means connected with said article feeding means for rotating one of said rollers in time with said feeding means, means controlled by said counter for moving one of said rollers toward the other when a batch of articles has been counted for engaging the strip of marker material between said rollers and for feeding it into the stack between the last article in the batch and the next following article added to the stack, and cut off means disposed between the stack and said rollers and operable in time with said feeding means for severing the inserted portion of the strip to form a projecting marker to visibly indicate the termination of the counted batch of articles.

2. In a counting and stacking machine, the combination of a reciprocable stroke bar for feeding articles to a stack of such articles, a counter arranged to count a predetermined number of articles as they are added to the stack to form a batch, counter actuating means operable adjacent said counter in time with said feeding means, detector means located in the path of articles and engageable by each article as it is added to said stack for connecting said counter actuating means with said counter to actuate the counter, a feed roller having rotatable connection with said stroke bar and disposed adjacent a normally stationary strip of marker material, means operable by said counter for pressing said strip against said feed roller when a batch of articles has been counted for feeding said strip into the stack between the last article in the batch and the next following article added to the stack, and cut off means disposed between said stack and said feed roller and operable in time with said stroke bar for severing the inserted portion of the strip to form a projecting marker to visibly indicate the termination of the counted batch of articles.

3. In a counting and stacking machine, the combination of means for feeding articles to a stack of such articles, a counter arranged to count a predetermined number of articles as they are added to the stack to form a batch, said counter including a rotatable counting wheel having a predetermined number of ratchet teeth on its periphery corresponding to the number of articles in a batch and a count divider wheel rotated by said counting wheel and having a notch in its periphery for each batch of articles, a pawl movable adjacent said counting wheel in time with said feeding means, detector means engageable by each article as it is added to said stack for moving said pawl into engagement with said counting wheel for operating said counter, a feed roller operable in time with said feeding means and disposed adjacent a normally stationary strip of marker material, lever means operable against the periphery of said count divider wheel and carrying a pressure roller engageable with said strip and pressing said strip against said feed roller when said lever means engages with a said notch in said count divider wheel for feeding said strip into the stack between the last article in a batch and the next following article added to the stack, and cut off means disposed between said stack and said feed roller and operable in time with said feeding means for severing the inserted portion of the strip to form a projecting marker to visibly indicate the termination of the counted batch of articles.

4. In a counting and stacking machine having provision for indicating predetermined batches of articles in a stack, the combination of a magazine for holding a stack of articles, a stroke bar movable toward and away from said magazine for feeding articles into said magazine, support means in said magazine for supporting an article introduced therein, means driven by a driving shaft for reciprocating said stroke bar, a lifter device vertically movable in said magazine and disposed below the feed line of said articles for lifting articles received in said magazine to a position above said feed line for building up a stack of articles in said magazine, support fingers yieldably mounted in said magazine for supporting the stack of articles as it builds up, means operable by said driving shaft for actuating said lifter device in time with said stroke bar, a counter arranged to count a predetermined number of articles as they are added to the stack to form a batch, counter actuating means connecting with and operable by said lifter device, detector means engageable by each article as it is added to said stack and effective on said counter actuating means when operated by an article for rendering said actuating means operative against said counter, means operable by said counter when a batch of articles has been counted for inserting a strip of marker material in the stack between the last article in the batch and the next following article added to the stack, and cut off means including a stationary blade disposed transversely of said strip on one side thereof and a movable cooperating blade on the opposite side thereof and actuated by and in time with said lifter device for severing the inserted portion of the strip to form a projecting marker to visibly indicate the termination of the counted batch of articles.

5. In a counting and stacking machine, the combination of a reciprocating stroke bar for feeding articles to a stack, a counter disposed adjacent said stack for counting the articles as they are added to the stack to form a batch containing a predetermined number, detector means connected with said counter and operated by each article as it is added to said stack, a feed roller located adjacent a normally stationary strip of marker material, a gear and rack device connected between said stroke bar and said feed roller for rotating said roller in synchronism with said stroke bar, a pressure roller located on the side of said marker material opposite said feed roller, and means connected with said counter and operable when a batch number of articles has been counted for moving said pressure roller into engagement with said strip and said strip against said rotating feed roller to feed the strip into the stack and to insert it between the last article in the batch and the next following article to be fed into said stack.

6. In a counting and stacking machine, the combination of a magazine for holding a stack of articles, feeding means for advancing articles into a position directly beneath said magazine, a counting finger located beneath said magazine in the path of an article entering the magazine, said finger being engaged and moved by each article as the article is reaching its position beneath said magazine under its advancement by said feeding means, lifter means operable in time with said feeding means and engageable with each article as received for lifting the article into said magazine to build up the stack of articles therein, yieldable means in said magazine engageable by and snapping past each lifted article for supporting said stack as it builds up, a counter located at one side of said magazine for counting articles as they are added to the stack to form a batch of predetermined number, each movement of said finger advancing the count of articles by said counter, a normally ineffective feed roller located adjacent a normally stationary strip of marker material, and means connected with said counter and operable when said batch count has been completed to make said feed roller effective to feed said marker strip into the stack beneath the last article in the batch and above the next following article added to the stack to visibly indicate the termination of the counted batch of articles.

7. In a counting and stacking machine, the combination of means for feeding articles in a predetermined path to a stack of such articles, a counter rotatably mounted on a counter shaft for counting the articles as they are added to the stack by said feeding means, said counter including a counting wheel having ratchet teeth corresponding in number to the number of articles in a batch and a control wheel rotatable together with said counting wheel and having a notch adjacent one of said ratchet teeth, a pawl located adjacent said ratchet teeth and movable about said counter shaft, said pawl being normally biased to a disengaged position relative to said ratchet teeth, means connecting with said feeding means for moving said pawl a distance equal to the distance between adjacent teeth on said counting wheel, detector means located adjacent an end of said stack of articles and connected to said pawl, said detector means including a finger normally biased to project into said predetermined path of articles entering said stack and moved by each article as it enters the stack for shifting said pawl into engagement with a tooth of said counting wheel for counting the articles and for rotating said control wheel to position its notch into a predetermined location corresponding to the number of articles in the batch, strip feeding means for advancing a strip of marker material into said stack, and follower means having a complementary part for engagement with the notch of said control wheel when the notch is in said predetermined location, said follower means having connection with said strip feeding means for actuating the strip feeding means in response to said controlled rotation of said counter to insert a separate marker strip into the stack to thereby visibly indicate the counted batch of articles.

RONALD E. J. NORDQUIST.

REFERENCES CITED

The following references are of record in the file of this patent:

UNITED STATES PATENTS

| Number | Name | Date |
| --- | --- | --- |
| 37,199 | Reay | Dec. 16, 1862 |
| 1,135,536 | Labombarde et al. | Apr. 13, 1915 |
| 1,860,223 | Bingham | May 24, 1932 |
| 2,004,604 | Ford et al. | June 11, 1935 |
| 2,382,998 | Kleinschmidt | Aug. 21, 1945 |